United States Patent
von Haas et al.

(10) Patent No.: US 9,168,712 B2
(45) Date of Patent: Oct. 27, 2015

(54) PELLETIZING PRESS FOR PRODUCING PELLETS

(75) Inventors: Gernot von Haas, Heidelberg (DE); Frank Heymanns, Oberderdingen (DE); Günter Natus, Mühltal (DE); Lars Bauer, Darmstadt (DE)

(73) Assignee: DIEFFENBACHER GMBH MASCHINEN- UND ANLAGENBAU, Eppingen (DE)

( * ) Notice: Subject to any disclaimer, the term of this patent is extended or adjusted under 35 U.S.C. 154(b) by 399 days.

(21) Appl. No.: 13/504,642

(22) PCT Filed: Oct. 30, 2010

(86) PCT No.: PCT/EP2010/006643
§ 371 (c)(1),
(2), (4) Date: Jul. 13, 2012

(87) PCT Pub. No.: WO2011/050986
PCT Pub. Date: May 5, 2011

(65) Prior Publication Data
US 2012/0272842 A1  Nov. 1, 2012

(30) Foreign Application Priority Data
Oct. 30, 2009  (DE) .................. 10 2009 051 379

(51) Int. Cl.
*B30B 3/02* (2006.01)
*B30B 11/22* (2006.01)

(52) U.S. Cl.
CPC ................................... *B30B 11/228* (2013.01)

(58) Field of Classification Search
CPC .... B30B 11/228; B30B 11/22; B30B 15/0082
USPC ............. 100/156, 155 R, 210, 903, 905, 907, 100/908; 425/73, 331
See application file for complete search history.

(56) References Cited

U.S. PATENT DOCUMENTS

| | | | |
|---|---|---|---|
| 2,075,450 A | 3/1937 | Meakin | |
| 2,124,744 A * | 7/1938 | Meakin | 425/306 |

(Continued)

FOREIGN PATENT DOCUMENTS

| | | |
|---|---|---|
| CN | 2059297 U | 7/1990 |
| CN | 201086411 Y | 7/2008 |

(Continued)

OTHER PUBLICATIONS

International Search Report dated Apr. 5, 2011 as received in corresponding PCT Application No. PCT/EP2010/006643, 4 pages.

(Continued)

*Primary Examiner* — Shelley Self
*Assistant Examiner* — Leonel Vasquez
(74) *Attorney, Agent, or Firm* — Foley & Lardner LLP

(57) ABSTRACT

A pelletizing press for producing pellets from material to be pressed, preferably from biomass, for use as fuel in fire places, wherein the biomass consists of cellulosic and/or lignocellulosic fibers, chips or shreds. In the pelletizing press, a dispersion chamber is formed by at least one die having a plurality of bores for pressing the biomass and at least by a lateral wall, and at least one roller rolling on a rolling surface of the die is arranged in the dispersion chamber. A pelletizing press of this method for producing pellets enables the formation of a dispersion chamber that, by means of at least one lateral wall, is as compact and sealed as possible relative to the prior art. At least two lateral wall parts are arranged to form a lateral wall; at least the first lateral wall part is arranged to be movable in relation to the second lateral wall part for carrying out a relative movement.

22 Claims, 2 Drawing Sheets

(56) References Cited

U.S. PATENT DOCUMENTS

| | | | |
|---|---|---|---|
| 2,167,900 A | | 8/1939 | Meakin |
| 2,432,326 A | * | 12/1947 | Meakin .................. 425/310 |
| 2,652,007 A | * | 9/1953 | Meakin .................. 425/183 |
| 2,670,697 A | * | 3/1954 | Meakin .................. 425/107 |
| 2,764,952 A | * | 10/1956 | Meakin .................. 425/196 |
| 4,558,559 A | * | 12/1985 | Klever et al. ............ 56/16.4 D |
| 5,393,473 A | * | 2/1995 | Payer et al. .................. 264/117 |
| 5,585,124 A | * | 12/1996 | Bittner .................. 425/331 |
| 6,375,447 B1 | * | 4/2002 | Zitron et al. .................. 425/86 |

FOREIGN PATENT DOCUMENTS

| | | | | |
|---|---|---|---|---|
| DE | 3806945 | * | 9/1989 | .............. B30B 11/28 |
| DE | EP 0331207 B1 | * | 12/1991 | .............. B30B 11/228 |
| DE | 202013101963 | * | 7/2014 | .............. B30B 11/00 |
| FR | 2962922 A1 | * | 1/2012 | .............. B30B 11/228 |
| GB | 820 325 A | | 9/1959 | |
| GB | 1 239 368 A | | 7/1971 | |

OTHER PUBLICATIONS

Office Action in CN Appln No. 201080049725 dated Jan. 22, 2014.

* cited by examiner

PELLETIZING PRESS FOR PRODUCING PELLETS

CROSS REFERENCE TO RELATED APPLICATIONS

The present invention is a National Stage of International Application No. PCT/EP2010/006643 filed on Oct. 30, 2010, which claims the benefit of German Patent Application No. 10 2009 051 379.5 filed on Oct. 30, 2009. The entire disclosures of which are incorporated herein by reference.

FIELD OF INVENTION

The invention relates to a pelletizing press for producing pellets.

BACKGROUND INFORMATION

The production of pellets, also referred to as granules, from fine material or compacted and/or molten material is already known. The production of pellets, or wood pellets from preferably chopped biomass, such as wood chips, sawdust, or the like, is also already sufficiently known and is propagated in the field of renewable energy sources as a pioneering technology for climate protection, in particular in Europe. Typically, chip material from the wood-processing industry is used as the raw material, however, freshly cut timber or types of wood which are not usable in the wood-processing industry or waste materials can also be used. Pollutant-free base material is preferably to be used for the market for wood pellets for supplying small furnace facilities in single-family or multi-family houses. Block power plants or special high-temperature furnace facilities for generating heat and/or obtaining electrical energy (combination power plants) can also cleanly combust pollutant-charged material (pellets made of particle hoard or medium-density fiberboard with or without a coating or lacquering) in small amounts, however.

The wood pellets are typically produced in so-called pelletizing presses, in which the material to be compressed is pressed through boreholes of a matrix by moving and/or actively rolling rollers, also referred to as pan grinder rollers. The material (biomass) is shaped by the boreholes and discharged as strands from the boreholes. Boreholes are understood as all openings which are preferably implemented as essentially cylindrical, and are arranged in a matrix to feedthrough and shape the material. The boreholes can also have larger intake areas (depressions) to improve the compression procedure and can be hardened or can have hardened sleeves in the boreholes. A differentiation is made between flat and ring matrices in the field of matrices. Rollers revolve externally or internally around on ring matrices for the compression, on flat matrices, the pan grinder rollers roll circularly (mill construction) or linearly reversing. The invention is preferably concerned with flat matrices of the latter construction, but can optionally also be used with ring matrices. The possibilities for preparing and scattering the biomass, or the post-processing (chopping of the strands, cooling, storage, transport) of the pellets do not have to be discussed in greater detail. Reference is made in this regard to the prior art.

Due to the warming of the climate, which has been acknowledged worldwide in the meantime, the industry has been forced to accelerate and cheapen the large-scale industrial production of wood pellets. However, in particular in large production facilities, which are partially to be assigned to specialized mechanical engineering or heavy mechanical engineering, large and heavy machine parts are used. In particular the bearings or other sensitive machine elements or control devices required for this purpose must be protected from fine dust which occurs during the production or already exists. The efforts of development are directed toward sealing off the pressing or scattering chamber of the material to be compressed or the biomass to the least possible extent. The problem in this case is the movable parts (matrices and/or rollers) in the pelletizing press, which execute a relative movement to one another inside the pressing chamber or the scattering chamber. A large-scale encapsulation of the pressing chamber or the scattering chamber is typically performed, which has the result that an excessively large area of the pelletizing press is contaminated, with corresponding effects on moving or operationally-relevant facility parts. Reference is made hereafter to the scattering chamber, which therefore describes the contaminated area inside the pelletizing press.

SUMMARY

The object of the invention is to provide a pelletizing press of the above-mentioned type for producing pellets, which, in relation to the prior art, allows the implementation of a scattering chamber which is as compact as possible and is sealed by at least one side wall.

The achievement of the object for a pelletizing press is that at least two side wall parts are arranged to implement a side wall, at least the first side wall part being arranged so it is movable in relation to the second side wall part to execute a relative movement.

The most compact possible scattering chamber can now advantageously be implemented in a pelletizing press, because a seal can occur between movable parts, in that one side wall is arranged fixed in the pelletizing press, preferably connected to the supply of the material to be compressed, and also takes over the sealing off of the scattering chamber, in addition to the function of guiding the material. A second part of the side wall is preferably assigned as a side wall part to a machine element movable in the pelletizing press, for example, the matrix or the rollers, and also executes its movement during the operation of the pelletizing press. In addition to the arrangement of at least one side wall part essentially on a movable matrix and/or essentially on at least one movable roller, the movable side wall parts can also be arranged on the associated movable holding means in the pelletizing press. For example, on a matrix mount, a matrix table, or on the bearings or the drives of the rollers. For a better seal between the two side wall parts in relation to the surroundings, the side wall parts can be arranged essentially overlapping and/or at least one sealing means for the seal can be arranged between the side wall parts. The side wall parts are preferably arranged essentially parallel or in a plane to implement an overlap or a transition of a side wall. At least one side wall part can be implemented partially in one piece with the matrix and/or the holding means of the matrix. The transition or the overlap between the first and the second side wall parts, which is implemented by the side wall parts, is particularly preferably arranged essentially between the axis of the rollers and the matrix. For this purpose, the side wall part arranged on the matrix has a height of at least 5 mm. In particular, the height of the side wall part on the matrix is to be 5 mm to 200 mm.

It is also possible to seal off the scattering chamber in the pelletizing press as compactly as possible, in particular in the case of a rotating circular flat matrix and stationary rollers. The essential bearings of the rollers of the matrix are simultaneously sealed off in relation to the scattering chamber and do not have to be encapsulated once again.

Further advantageous measures and embodiments of the subject matter of the invention are disclosed in the subclaims and the following description with the drawing.

DETAILED DESCRIPTION OF VARIOUS EMBODIMENTS

Figure 1:
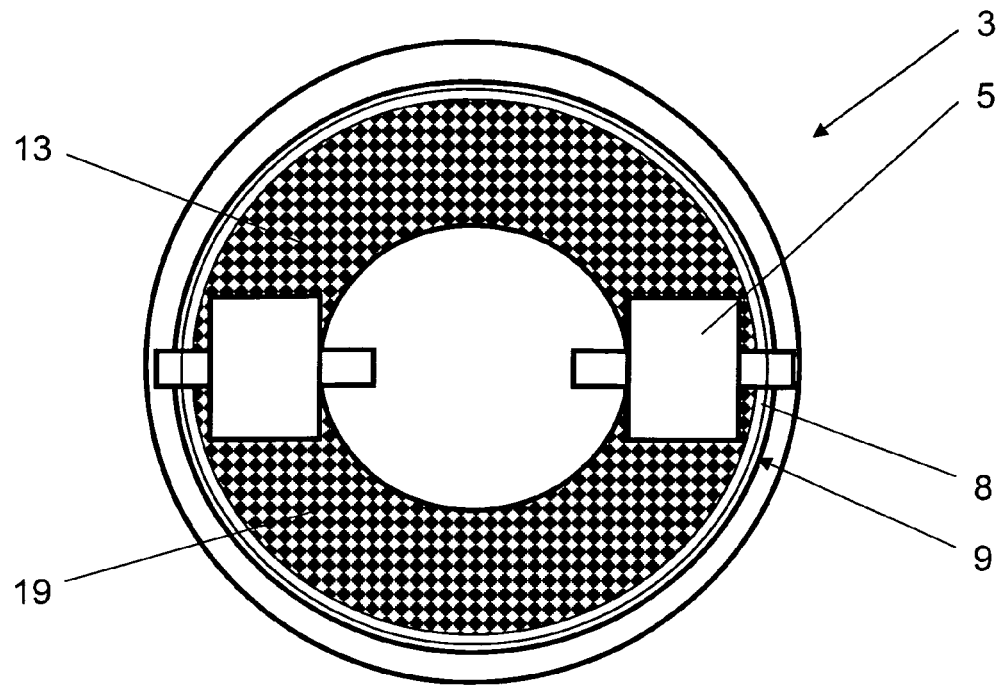
FIG. 1 shows a top view of a circular flat matrix and two rollers rolling thereon.
Figure 2:
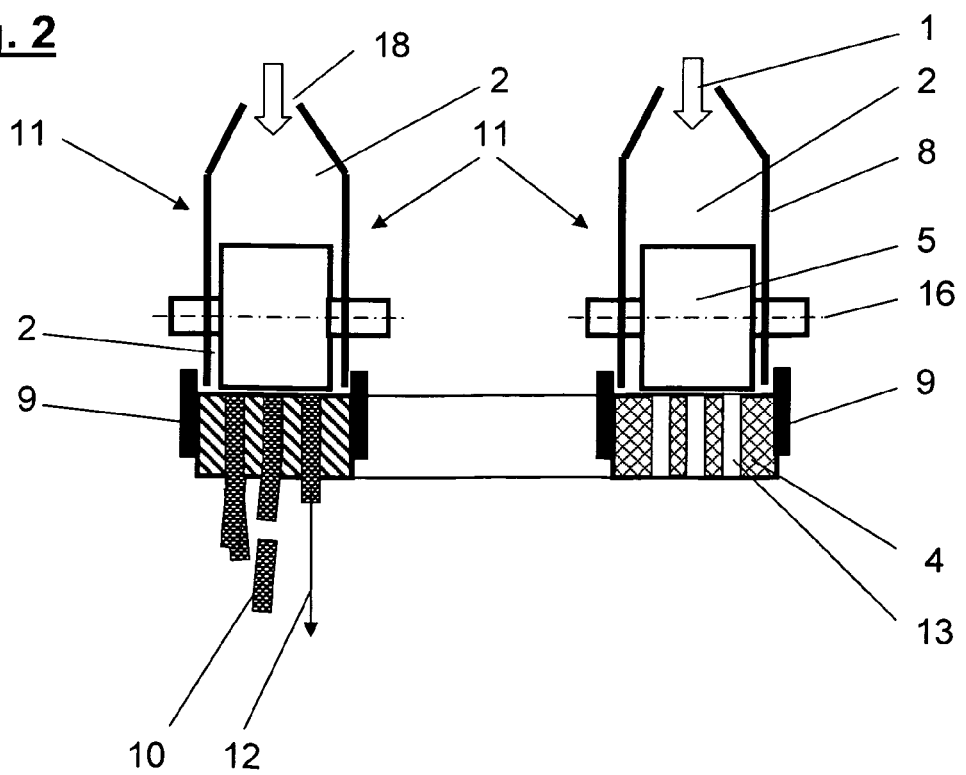
FIG. 2 shows a sectional view through the rollers and the flat matrix according to FIG. 1.

In FIGS. 1 and 2, the drawing shows a pelletizing press 3 in a top view and in a sectional side view. At least one roller 5 rotates around a central axis of a circular matrix 4 having boreholes 13. The biomass 1 is introduced from above into the scattering chamber 2 and is distributed uniformly on the matrix 4. In the present example, the matrix 4 and/or the rollers 5 can execute a rotational movement and can be driven by suitable means, typically by means of a hollow shaft, which is arranged in the central opening of the circular matrix. The rollers 5 roll on the rolling surface 19 because of the initiated relative movement and compress the biomass 1 present in the scattering chamber 2 into the boreholes 13. During the passage through the boreholes 13 of the matrix 4 in the feedthrough direction 12, a material strand results, which is finally actively (cutting blades) or passively (conveyance fracture) divided into pellets 10. The scattering chamber 2 is therefore delimited in this preferred exemplary embodiment by an inner and an outer side wall 11 and in the feedthrough direction 12 by the matrix 4. Depending on the embodiment of the pelletizing press 3, a hollow shaft can also be arranged instead of the inner side wall 11, which drives the matrix 4 and/or the rollers 5 and is accordingly moved rotationally along its axis. If the matrix 4 is driven by the hollow shaft, for example, no inner side wall 11 is necessary, which requires a seal. Fundamentally, it is comprehensible that during a rotational movement of the matrix 4, the biomass 1 or dust and non-compressed material is primarily driven outward by the centrifugal force and an optimum seal of the scattering chamber 2 in relation to the surroundings is advantageous in the case of a fixed side wall 11.

According to FIG. 2, both side walls 11 thus preferably comprise sheet metal enclosures, which extend from the supply opening 18 up to the matrix 4, arranged concentrically to the central axis of the planar matrix 4. In order to implement an optimum scattering chamber 2, the scattering walls 11 are preferably designed in their arrangement in such a manner that the scattering chamber 2 essentially corresponds in its width to the rolling surface 19 and ensures the required space for the rollers 5. In order to achieve an optimum sealing action in relation to the surroundings, the side wall 11 is divided into at least two side wall parts 8 and 9. In an exemplary embodiment having a rotating matrix 4, the first side wall part 9 is arranged on the matrix 4 and also executes the rotational movement of the matrix 4. A relative movement arises accordingly between the side wall parts 8 and 9.

Figure 4:
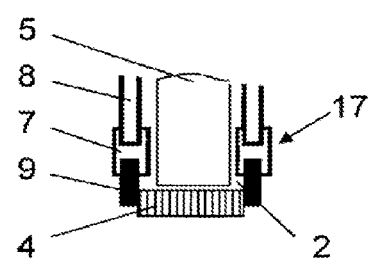
FIG. 4 shows a detail of a side of a circular ring matrix having associated side walls in a plane with associated seal according to FIG. 2.
Figure 5:
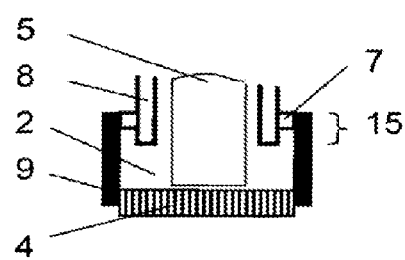
FIG. 5 shows a detail of a side of a circular ring matrix having associated adjacent side walls with a seal according to FIG. 2.
Figure 6:
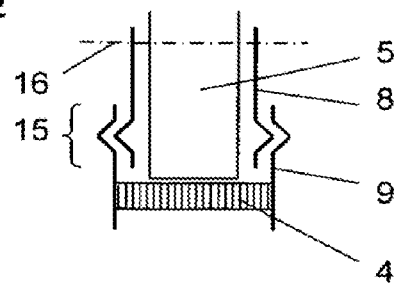
FIG. 6 shows a further detail of a possible embodiment variant of adjacent side walls with formfitting seal.

Possible variants of a preferred embodiment of the overlap 15 or the transition 17 of the two side wall parts 8 and 9 are shown in FIGS. 4 to 6. According to FIG. 4, two H-shaped sealing means 7 are arranged between the side wall parts 8 and 9, which are located essentially in a plane, of the two side walls 11. The transition 17 is therefore sealed in a low-friction and effective manner. Corresponding arrangements or possible variations of the sealing means are within the field of experience of a designer who makes use of the required measures for the optimum seal and the corresponding material selection.

In FIG. 5, the two side wall parts 8 and 9 are arranged essentially parallel to one another and preferably form an overlap 15 of the side wall parts 8 and 9 to one another. This overlap 15 can also be sealed by a sealing means 7. However, geometrical or formfitting solutions for the seal as shown in FIG. 6 would also be conceivable. At least one side wall part 8 or 9 is particularly preferably implemented as flexible or pliant in the area of the overlap 15 or the transition 17 in order to be able to compensate for any possible inaccuracies in the case of a sliding arrangement of the side wall parts 8 and 9 to one another and simultaneously implement the greatest possible sealing effect. In particular a springy implementation, at least in the area of the transition 17 or the overlap 15, would be conceivable.

Figure 3:
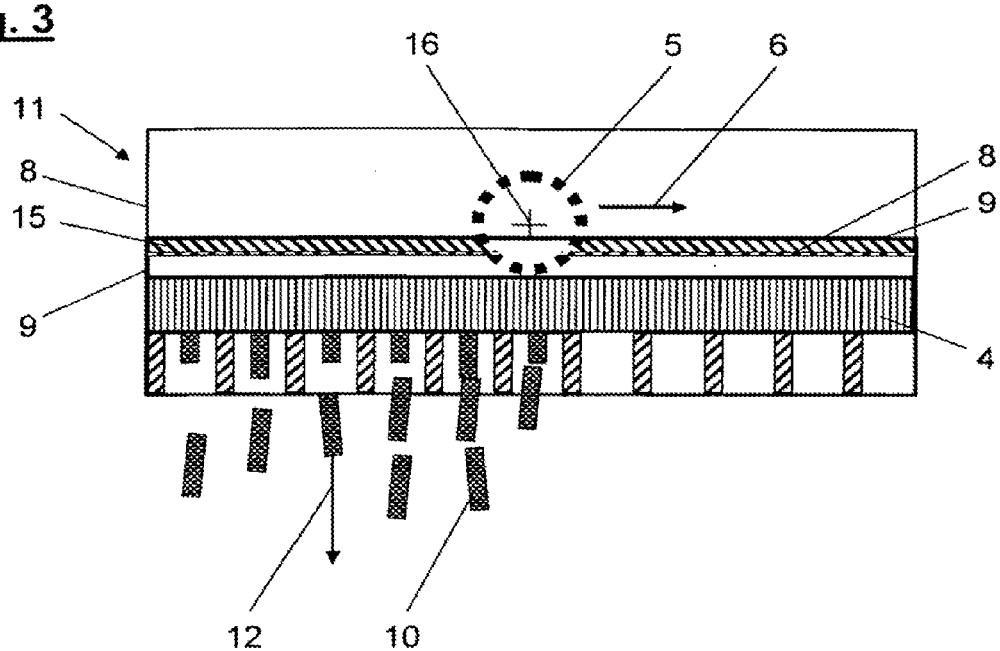
FIG. 3 shows a side view of a rectangular flat matrix having reversing movable roller and/or reversing movable matrix.

In an alternative embodiment, according to FIG. 3, a rectangular flat matrix 4 could also be used, the roller 5 and/or the matrix 4 executing a reversing movement in or opposite to the rolling direction 6 and compressing the biomass 1 to form pellets 10. In the side view, the preferred overlap of the side wall parts 8 and 9 can be seen, the second side wall part 8 preferably being arranged displaced in the direction of the scattering chamber 2 and the first side wall part 9 arranged closer to the matrix 4 in the feedthrough direction 12 being offset outward so it is adjacent or adjoining, and therefore covering the lower part of the side wall part in the area of the overlap 15. The overlap 15 or the transition 17 between the side wall parts 8 and 9, which essentially implement the plane or the area of the existing relative movement to one another, is preferably arranged between at least one axis 16 of the roller 5 and the matrix 4 or the rolling surface 19.

LIST OF REFERENCE NUMERALS: DP 1389

1 biomass
2 scattering chamber
3 pelletizing press
4 matrix
5 roller
6 rolling direction
7 sealing means
8 second side wall part
9 first side wall part
10 pellets
11 side wall
12 feedthrough direction
13 boreholes
14 seal
15 overlap
16 axis
17 transition
18 supply opening
19 rolling surface

The invention claimed is:

1. A pelletizing press for producing pellets from biomass for use as fuel in fireplaces, the pelletizing press comprising:
   a scattering chamber having at least an outer side wall;
   a matrix having a rolling surface and a plurality of boreholes configured to compress biomass;
   at least one roller configured to roll on the rolling surface of the matrix, the at least one roller being arranged in the scattering chamber;
   wherein the outer side wall is comprised of a first side wall part and a second side wall part,
   wherein, during operation of the pelletizing press, the first side wall part is movable in a rotational direction about a central axis of the matrix in relation to the second side wall part; and
   wherein a seal is arranged between the first side wall part and the second side wall part to seal the scattering chamber in relation to surroundings of the scattering chamber.

2. The pelletizing press according to claim 1, wherein the matrix is movable in relation to the scattering chamber, and wherein the first side wall part is arranged essentially on the movable matrix.

3. The pelletizing press according to claim 1, wherein the first side wall part and the second side wall part are arranged essentially parallel to one another and form an overlap between the first side wall part and the second side wall part.

4. The pelletizing press according to claim 1, wherein at least part of the first side wall part is formed as a single, integral piece with the matrix.

5. The pelletizing press according to claim 3, wherein the overlap between the first side wall part and the second side wall part is arranged essentially between an axis of the at least one roller and the matrix.

6. The pelletizing press according to claim 1, wherein the first side wall part is arranged on the matrix and has a height of at least 5 mm.

7. The pelletizing press according to claim 1, wherein the first side wall part is arranged on the matrix and has a height of 5 mm to 200 mm.

8. The pelletizing press according to claim 1, wherein the outer side wall is connected to a supply opening configured to receive the biomass.

9. A pelletizing press for producing pellets from biomass for use as fuel in fireplaces, the pelletizing press comprising:
   a scattering chamber having at least an outer side wall;
   a matrix having a rolling surface and a plurality of boreholes configured to compress biomass;
   at least one roller configured to roll on the rolling surface of the matrix, the at least one roller being arranged in the scattering chamber;
   wherein the outer side wall is comprised of a first side wall part and a second side wall part, the first side wall part being movable in relation to the second side wall part;
   wherein a seal is arranged between the first side wall part and the second side wall part to seal the scattering chamber in relation to surroundings of the scattering chamber;
   wherein the first side wall part and the second side wall part are arranged essentially parallel to one another and form an overlap between the first side wall part and the second side wall part; and
   wherein the first side wall part and the second side wall part are essentially flexible or bendable at least in an area of the overlap to compensate for inaccuracies.

10. The pelletizing press according to claim 1, wherein the first side wall part and the second side wall part are arranged essentially in a plane and form a transition, the transition being a space between the first side wall part and the second side wall part.

11. The pelletizing press according to claim 10, wherein the transition between the first side wall part and the second side wall part is arranged essentially between an axis of the at least one roller and the matrix.

12. A pelletizing press for producing pellets from biomass for use as fuel in fireplaces, the pelletizing press comprising:
   a scattering chamber having at least an outer side wall;
   a matrix having a rolling surface and a plurality of boreholes configured to compress biomass;
   at least one roller configured to roll on the rolling surface of the matrix, the at least one roller being arranged in the scattering chamber;
   wherein the outer side wall is comprised of a first side wall part and a second side wall part, the first side wall part being movable in relation to the second side wall part;
   wherein a seal is arranged between the first side wall part and the second side wall part to seal the scattering chamber in relation to surroundings of the scattering chamber;
   wherein the first side wall part and the second side wall part are arranged essentially in a plane and form a transition, the transition being a space between the first side wall part and the second side wall part; and
   wherein first side wall part and the second side wall part are essentially flexible or bendable at least in an area proximate to the transition to compensate for inaccuracies.

13. The pelletizing press according to claim 1, wherein the first side wall part and the second side wall part are arranged essentially parallel to one another and form an overlap between the first side wall part and the second side wall part.

14. The pelletizing press according to claim 1, wherein the first side wall part and the second side wall part are arranged essentially in a plane and form a transition, the transition being a space between the first side wall part and the second side wall part.

15. The pelletizing press according to claim 1,
   wherein the scattering chamber further comprises an inner side wall comprised of a first side wall part and a second side wall part, the first side wall part of the inner side wall being movable in the rotational direction about the central axis of the matrix in relation to the second side wall part of the inner side wall, and
   wherein the first side wall part of the inner side wall and the second side wall part of the inner side wall are symmetrical to the first side wall part of the outer side wall and the second side wall part of the outer side wall with respect to a central axis of a portion of the scattering chamber enclosed between the inner side wall and the outer side wall.

16. The pelletizing press according to claim 15, wherein a width of the scattering chamber bounded by the outer side wall and the inner side wall is equal to a width of the rolling surface of the matrix.

17. The pelletizing press according to claim 9, wherein the matrix is movable in relation to the scattering chamber, and wherein the first side wall part is arranged essentially on the movable matrix.

18. The pelletizing press according to claim 9,
   wherein the scattering chamber further comprises an inner side wall comprised of a first side wall part and a second side wall part, the first side wall part of the inner side wall being movable in relation to the second side wall part of the inner side wall, and
   wherein the first side wall part of the inner side wall and the second side wall part of the inner side wall are symmetrical to the first side wall part of the outer side wall and the second side wall part of the outer side wall with respect to a central axis of a portion of the scattering chamber enclosed between the inner side wall and the outer side wall.

19. The pelletizing press according to claim 18, wherein a width of the scattering chamber bounded by the outer side wall and the inner side wall is equal to a width of the rolling surface of the matrix.

20. The pelletizing press according to claim 12, wherein the matrix is movable in relation to the scattering chamber, and wherein the first side wall part is arranged essentially on the movable matrix.

21. The pelletizing press according to claim 12,
wherein the scattering chamber further comprises an inner side wall comprised of a first side wall part and a second side wall part, the first side wall part of the inner side wall being movable in relation to the second side wall part of the inner side wall, and
wherein the first side wall part of the inner side wall and the second side wall part of the inner side wall are symmetrical to the first side wall part of the outer side wall and the second side wall part of the outer side wall with respect to a central axis of a portion of the scattering chamber enclosed between the inner side wall and the outer side wall.

22. The pelletizing press according to claim 21, wherein a width of the scattering chamber bounded by the outer side wall and the inner side wall is equal to a width of the rolling surface of the matrix.

\* \* \* \* \*